Figures 1, 2:
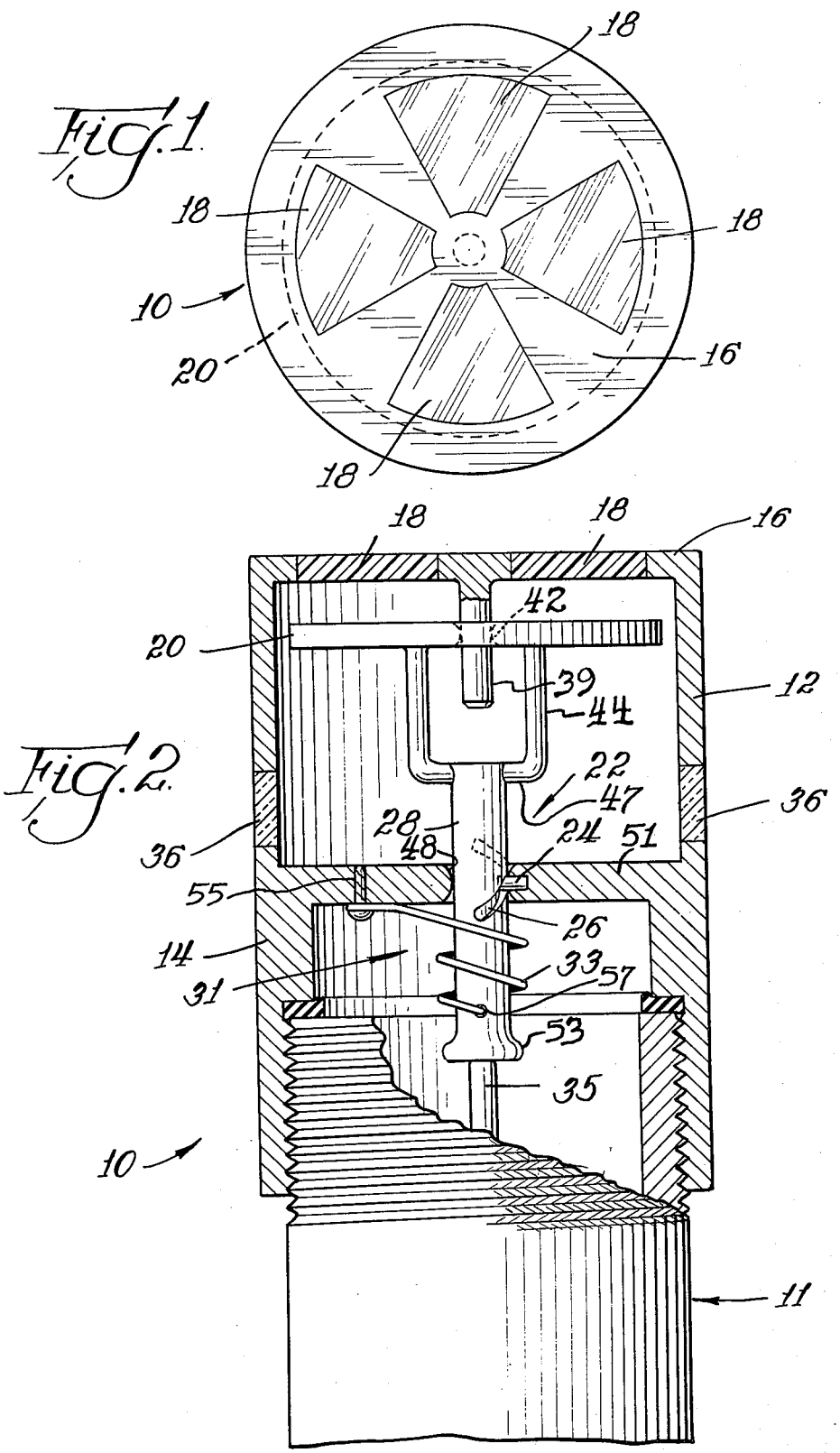

United States Patent [19]

Brannis et al.

[11] 3,999,503
[45] Dec. 28, 1976

[54] PNEUMATIC TIRE PRESSURE INDICATOR

[76] Inventors: Janne M. Brannis, 835 Division, Northbrook, Ill. 60062; Thomas C. Wright, 8476 W. 103 Terrace, Chicago, Ill. 60620

[22] Filed: Jan. 9, 1976

[21] Appl. No.: 647,907

[52] U.S. Cl. .............................................. 116/34 R
[51] Int. Cl.² ......................................... B60C 23/04
[58] Field of Search ........... 73/146.3, 146.2, 146.8; 116/34 R

[56] References Cited

UNITED STATES PATENTS

| | | | |
|---|---|---|---|
| 1,010,726 | 12/1911 | Collins | 116/34 R |
| 2,697,999 | 12/1954 | Crookston et al. | 116/34 R |
| 2,866,432 | 12/1958 | Laurie | 116/34 R |
| 3,523,451 | 8/1970 | Kohn | 73/146.8 |

*Primary Examiner*—Donald O. Woodiel
*Attorney, Agent, or Firm*—Bernard L. Kleinke

[57] ABSTRACT

A pneumatic tire pressure indicator adapted to be attached to a valve stem of a pneumatic tire for designating a low pressure condition therein includes a member defining at least one window in a housing, and an attention-attracting member mounted on the housing out of proper orientation relative to the window to conceal the attention-attracting member from view when normal air pressure exists within the tire. A mechanism rotates the members relative to one another to properly orient them to expose the attention-attracting member through the window for indicating purposes when the tire pressure falls below a predetermined value. A sensing mechanism activates the rotating mechanism when the pressure within the pneumatic tire falls below the predetermined value. In one embodiment of the invention, the member defining at least one window and the attention-attracting member each includes optically polarized material which are normally oriented in a cross polarized manner to conceal the attention-attracting member from view, the members being rotated relative to one another to cause the attention-attracting member to be visible through the other polarized material serving as a window.

10 Claims, 2 Drawing Figures

U.S. Patent  Dec. 28, 1976  3,999,503

3,999,503

PNEUMATIC TIRE PRESSURE INDICATOR

The present invention relates to a pneumatic tire pressure indicator, and it more particularly relates to an indicator adapted to be attached to a valve stem of a pneumatic tire to designate a low pressure condition therein.

Many different devices have been employed for indicating the pressure in pneumatic tires. For example, reference may be made to the following U.S. Pat. Nos.: 1,610,452; 1,644,193; 2,225,675; 2,906,282; 3,131,667; and 3,260,233. While the prior known devices may be satisfactory for some applications, it would be highly desirable to have a tire pressure indicator which is reliable in operation and inexpensive to manufacture. In this regard, such an indicator could become widely used as a result of its relatively inexpensive cost, and yet it would greatly add to safety for the operation of a vehicle. Also, by making sure that the tires of a motor vehicle are always adequately inflated, more efficient gasoline consumption can be achieved, and thus such a widely accepted tire pressure indicator would have a significant positive impact on the conservation of natural resources and energy.

Therefore, the principal object of the present invention is to provide a new and improved pneumatic tire pressure indicator, which is relatively inexpensive to manufacture, and which is convenient and reliable to use.

Another object of the present invention is to provide such a new and improved tire pressure indicator which can be attached readily to a tire valve stem, and which can provide a clear indication of a low tire pressure.

Briefly, the above and further objects are realized in accordance with the present invention by providing an indicator having a member defining at least one window in the housing of the indicator, and an attention-attracting member mounted on the housing disposed normally out of proper orientation relative to the window to conceal the attention-attracting member from view. A rotating mechanism rotates the members relative to one another to properly orient them to expose the attention-attracting member through the window for indicating purposes. A sensing mechanism activates the rotating mechanism when the pressure within the pneumatic tire to which the indicator is attached, falls below a predetermined value. According to one embodiment of the present invention, the pair of members are at least partially composed of optically polarized material which polarized members are normally disposed in a cross polarized condition to conceal the second polaroid member from view. The rotating mechanism causes the polarized members to be rotated relative to one another until the second attention-attracting member becomes visible to an observer through the first member serving as the window when the pressure within the pneumatic tire falls below the predetermined value.

The above, and still further highly important objects and advantages of the invention will become apparent from the following detailed specification, appended claims, and attached drawings, wherein:

FIG. 1 is a plan view of the front end of a tire pressure indicator which is constructed in accordance with the principles of the present invention; and FIG. 2 is a vertical cross-sectional elevational view of the indicator of FIG. 1 showing the indicator attached to a tire valve stem.

Referring now to the drawings, and more particularly to FIGS. 1 and 2 thereof, there is shown a tire pressure indicator 10, which is constructed in accordance with the present invention, and which is attached to a tire valve stem 11 of a pneumatic tire (not shown). As hereinafter more fully described, the tire pressure indicator 10 designates a low pressure condition in the tire so that the operator of the vehicle (not shown) supported by the tire can properly inflate the tire. The indicator 10 includes a tubular housing 12 having a threaded rear end portion 14 for threadably engaging the tire valve stem 11, and a front end member 16 having a plurality of windows 18 composed of optically polarized material. A disc 20 mounted within the interior of the housing 12 adjacent the windows 18 of the member 16 is also composed of optically polarized material of a bright color, such as red or orange fluorescent color, whereby the windows 18 and the disc 20 are normally arranged in a cross polarized position so that the disc 20 is not visible through the windows 18. A positioning mechanism 22 comprising a pin 24 extending into a spiral groove 26 extending about a rod 28 to which the disc 20 is fixed, rotates the disc 20 and the member 16 having the windows 18 therein relative to one another until the windows 18 and the disc 20 are no longer in a cross optically polarized position, whereby the disc 20 then becomes visible through the window 18 and the user can readily see the brightly colored disc 20 to designate a low pressure condition in the pneumatic tire. A sensing mechanism 31 in the form of a biasing spring 33 urges resiliently the rod 28 rearwardly into engagement with the valve pin 35 of the tire valve stem 11 so that when the pressure within the tire falls below a predetermined value, the spring 33 moves the rod 28 axially rearwardly against the force of the now lower air pressure within the tire. As a result, the rod 28 rotates due to the pin 24 and the spiral groove 26 to cause the relative movement between the windows 18 and the disc 20. When the pneumatic tire is properly inflated with air, the air pressure forces the pin 35 outwardly to a position where the rod 28 compresses the biasing spring 33 and positions the rod 28 axially to maintain the windows 18 and the disc 20 in a crossed polarized condition to conceal the disc 20 from view.

Considering now the indicator 10 in greater detail, the tubular housing 12 includes a series of transparent non-polarized windows 36 disposed to the rear of the polarized windows 18 to enable light to shine through the disc 20 and out the windows 18 when the windows 18 and the dics 20 are disposed in light-transmitting relationship relative to one another. A depending rod 39 is centrally disposed and extends from the underside of the front end member 16 through a hole 42 in the disc 20 so that it can rotate thereabout. A bifurcated forward end portion 44 of the rod 28 is fixed to the rear side of the disc 20 and straddles the distal end portion of the rod 39.

A shoulder 47 of the forward end portion 44 of the rod 28 serves to limit rearward axial movement of the rod 28 when the tire pressure falls below the predetermined pressure. A hole 48 in a fixed support plate 51 within the tubular housing 12 receives an intermediate portion of the rod 28 and has disposed therein the pin 24. An enlarged rear end portion 53 of the rod 28 is adapted to engage the spring-loaded valve pin 35 of the biasing spring 33. The spring 33 of the indicator 10 has one of its ends fixed to a pin 55 depending from the rear side of the plate 51, and it has its other end fixed to a pin 57 on the rear end portion 53 of the rod 28.

In operation, the tubular housing 12 of the indicator 10 is threaded onto the valve stem 11 and the front end portion 53 of the rod 28 moves into engagement with the valve pin 35. Assuming that the tire pressure is adequate (above a predetermined value), the spring 33 is compressed and the rod 28 moves axially toward the front end member 16 until the pin 24 is disposed in the rear end portion of the spiral groove 26. At this point, the windows 18 and the disc 20 are in cross-polarized relationship so that the brightly colored disc 20 is not visible through the windows 18.

When the tire pressure falls below the predetermined value, the spring 33 urges the rod 28 axially rearwardly against the force of the air pressure within the tire and the spring-loaded valve pin 35. As a result of the pin 24 being disposed in the spiral groove 26, the rod 28 rotates axially through a 90 degree rotation and stops at the forward end of the spiral groove 26. At this point, the windows 18 and the disc 20 are in light-transmitting orientation so that light can flow through the transparent windows 36, the disc 20 and out the windows 18 to make the brightly colored disc visible through the windows 18. Thus, the operator of the vehicle is warned that the pressure in the tire having the stem 11 is below a predetermined value, and thus the tire should be inflated properly.

While the present invention has been described in connection with a particular embodiment thereof, it will be understood that many changes and modifications of this invention may be made by those skilled in the art without departing from the true spirit and scope thereof. Accordingly, the appended claims are intended to cover all such changes and modifications as fall within the true spirit and scope of the present invention.

What is claimed is:

1. An indicator adapted to be attached to a valve stem having a valve pin of a pneumatic tire for designating a low pressure condition therein, comprises:
   an imperforate tubular housing having front and rear end portions, said rear end portion being adapted to be attached to the valve stem;
   a member defining at least one transparent imperforate window in said housing;
   an attention-attracting member movably mounted within said housing and disposed normally out of proper orientation relative to said window to conceal said attention-attracting member from view;
   an elongated positioning device extending within said tubular housing between a position near said front end portion and a position near said rear end portion for engaging operatively the valve pin, said device further including moving means for moving said attention-attracting member relative to said window to expose said attention-attracting member therethrough
   means connecting said elongated member and said attention-attracting member; and
   biasing means for urging resiliently said positioning device rearwardly against the force of the pressure within the tire so that when the pressure within the pneumatic tire falls below a predetermined value, said positioning device moves axially rearwardly to cause said members to be oriented properly for indicating purposes.

2. An indicator according to claim 1, wherein said positioning device includes a slidably-mounted axially-extending rod for engaging operatively at one of its ends the valve stem to move axially within said housing when the pressure within the tire falls below the predetermined value, and said moving means includes a mechanism for converting rectilinear movement of said rod to rotational movement.

3. An indicator according to claim 2, wherein said mechanism includes means defining a spirally-extending groove in said rod, a pin being fixedly mounted on said housing and extending into said groove.

4. An indicator according to claim 3, wherein said member defining at least one window and said attention-attracting means each includes optically polarized material.

5. An indicator according to claim 4, wherein said attention-attracting member has a bright color facing said window.

6. An indicator according to claim 5, further including means defining at least one window in said housing disposed rearwardly of said attention-attracting member to permit light to flow through said attention-attracting member from the back side thereof.

7. An indicator according to claim 1, wherein said member defining at least one window and said attention-attracting means each includes optically polarized material.

8. An indicator according to claim 7, wherein said attention-attracting member has a bright color facing said window.

9. An indicator according to claim 8, further including means defining at least one window in said housing disposed rearwardly of said attention-attracting member to permit light to flow through said attention-attracting member from the back side thereof.

10. An indicator according to claim 1, wherein said biasing means includes a coil spring, said front end portion of said positioning device being enlarged to engage conveniently the valve pin.

* * * * *